United States Patent [19]

Leigh-Monstevens et al.

[11] Patent Number: 5,070,983

[45] Date of Patent: Dec. 10, 1991

[54] DAMPER FOR HYDRAULIC CLUTCH ACTUATOR

[75] Inventors: Keith V. Leigh-Monstevens, Rochester Hills; Julie A. Hartig, Waterford, both of Mich.

[73] Assignee: Automotive Products plc, Warwickshire, Channel Islands

[21] Appl. No.: 604,158

[22] Filed: Oct. 29, 1990

[51] Int. Cl.$^5$ .................. F16D 25/8; F16D 25/14
[52] U.S. Cl. .................. 192/85 C; 60/469; 192/30 V; 192/109 F; 303/87
[58] Field of Search .......... 192/30 V, 109 D, 109 F, 192/85 C, 85 CA; 60/469; 303/87; 92/103 M

[56] References Cited

U.S. PATENT DOCUMENTS

| | | | |
|---|---|---|---|
| 3,430,660 | 3/1969 | Mitton | 303/87 X |
| 3,529,872 | 9/1970 | Mitton | 303/87 X |
| 3,572,479 | 3/1971 | Kelley | 192/109 F X |
| 4,166,655 | 9/1979 | Spero | 303/87 |
| 4,188,073 | 2/1980 | Ishikawa et al. | 303/87 |
| 4,301,908 | 11/1981 | Fukuda et al. | 192/109 F |
| 4,473,145 | 9/1984 | Bopp | 192/109 F X |
| 4,779,625 | 10/1988 | Cole | 303/87 X |
| 4,911,276 | 3/1990 | Leigh-Nonstevens et al. | 192/85 C X |
| 4,924,992 | 5/1990 | Romig | 192/30 V |

FOREIGN PATENT DOCUMENTS

| | | | |
|---|---|---|---|
| 478522 | 11/1951 | Canada | 60/469 |
| 3807954 | 9/1989 | Fed. Rep. of Germany | |
| 2630188 | 10/1989 | France | |
| 54-3731 | 1/1979 | Japan | |
| 59-50232 | 3/1984 | Japan | |
| 59-89833 | 5/1984 | Japan | |
| 59-89834 | 5/1984 | Japan | |
| 996841 | 6/1965 | United Kingdom | 60/469 |
| 1562709 | 3/1980 | United Kingdom | |
| 2058272 | 4/1981 | United Kingdom | |

*Primary Examiner*—Rodney H. Bonck
*Attorney, Agent, or Firm*—Krass & Young

[57] ABSTRACT

A damper for use with a hydraulic clutch actuator of the type including a master cylinder and a slave cylinder with a conduit interconnecting the outlet of the master cylinder and the inlet of the slave cylinder. The damper is positioned in the conduit between the master cylinder and slave cylinder and includes a diaphragm having a front face constituting a barrier wall of the hydraulic system so that the diaphragm can deflect in response to vibrations transmitted through the hydraulic fluid in the system to effect damping of the vibration and further includes a structure confronting but spaced from the rear face of the central region of the diaphragm which operates to limit the deflection of the central region of the diaphragm to a predetermined maximum magnitude to limit the stress at the center of the diaphragm to an acceptable level and thereby improve the fatigue life of the diaphragm. The limiting structure may comprise an upset portion on the cover; an elastomeric button on the inner face of the cover; a Belleville spring between the rear face of the diaphragm and the inside face of the cover; or a suitable liquid in the space between the rear face of the diaphragm and the inner face of the cover. The space between the limiting structure and the rear face of the diaphragm may be selectively varied to accommodate hydraulic control systems of varying hydraulic characteristics.

11 Claims, 3 Drawing Sheets

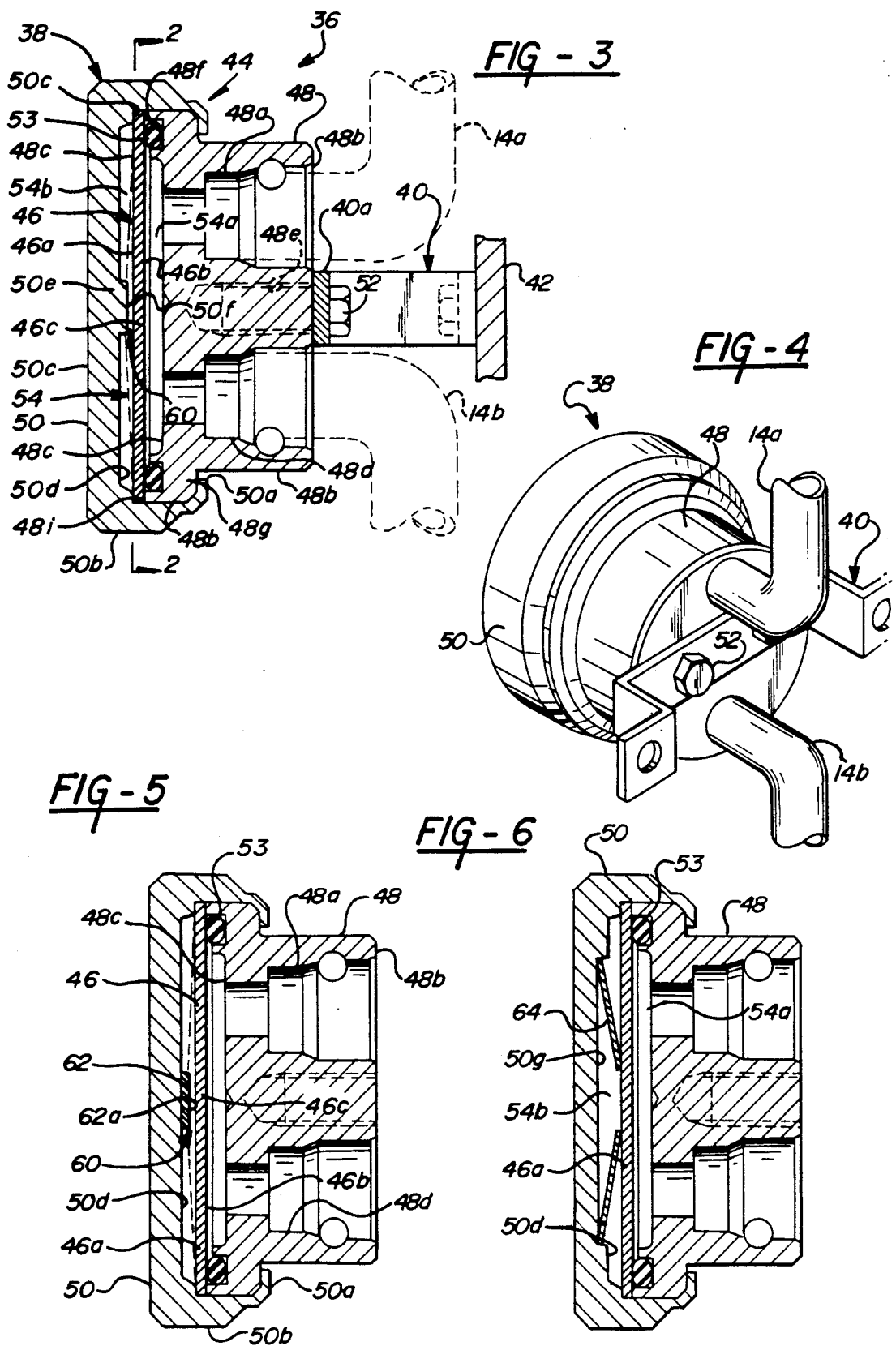

DAMPER FOR HYDRAULIC CLUTCH ACTUATOR

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at the remote location. A conduit interconnects the master cylinder to the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch of a motor vehicle so that when the clutch pedal of the vehicle is depressed by the driver, the slave cylinder is actuated to operate the clutch in known manner. Preferably, as described in U.S. Pat. No. 4,599,860 assigned to the assignee of the present application, the clutch actuator is provided to the motor vehicle manufacturer in an assembled, prefilled form to simplify installation of the actuator on the vehicle, avoid the inconvenience of potential spillage of hydraulic fluid during on-line filling, eliminate the necessity to bleed or purge the lines of the actuator to facilitate the filling process, and eliminate the need to test the actuator after installation and filling. Whereas hydraulic clutch actuators, and particularly prefilled clutch actuators, have enjoyed significant commercial success they have the ability to transmit vibrations backwardly through the system from the clutch to the clutch pedal with the result that the operator may experience unpleasant vibrations at the clutch pedal.

Specifically, imbalances in the crankshaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and thence through the master cylinder push rod to the clutch pedal where they are experienced by the operator as vibrations of the clutch pedal. The propagated vibrations also generate a pedal growl which is audible to the operator as well as a clutch roar which may also be audible to the operator.

Various devices have been proposed in an attempt to attenuate these vibrations. For example, tuned masses have been attached to various parts of the clutch system including the clutch release lever, the slave cylinder push rod, and the clutch pedal. Rubber dampers have also been employed in the master cylinder push rod, rubber hose sections have been employed in the conduit interconnecting the master cylinder and the slave cylinder, and various damper devices have been proposed for installation in the interconnecting conduit. In particular, a damper device as shown in British patent Specification 1562709, and assigned to the assignee of the present invention, may be installed in the conduit interconnecting the master cylinder and the slave cylinder.

Whereas these prior art devices have been successful in varying degrees in attenuating the vibrations in the system, they have each suffered one or more shortcomings. Specifically, the prior art devices have been unduly expensive; or they have actually introduced vibrations into the system by virtue of a hysteresis effect; or they have required a package size that has complicated their installation and placement in the crowded under hood environment of a modern day motor vehicle; or they have been difficult to selectively adjust to accommodate varying vehicular applications; or they have exhibited a relatively short useful product life.

SUMMARY OF THE INVENTION

The present invention is directed to the provision of an improved damper device for use in association with a hydraulic clutch actuator.

More particularly, the present invention is directed to the provision of an improved damper device for use in association with a hydraulic clutch actuator which effectively attenuates vibrations in the system, provides an extremely long product life, and may be readily adjusted to accommodate varying vehicular attenuation requirements.

According to an important feature of the invention, the invention damper is adapted for installation in a clutch hydraulic actuator system between the master cylinder and slave cylinder of the system and includes a housing, a diaphragm mounted in the housing with its periphery fixed with respect to the housing and having a first face constituting a boundary wall of the hydraulic system so that the diaphragm can deflect in response to vibrations transmitted through hydraulic fluid in the system to effect damping of the vibrations, and limit means confronting the other face of the diaphragm and operative to limit the deflection of the central region of the diaphragm to a predetermined maximum magnitude. This arrangement allows the diaphragm to operate effectively to attenuate vibrations in the system and yet the stress placed on the central regions of the diaphragm are limited in such a manner as to significantly prolong the useful life of the diaphragm and thereby of the damper.

According to a further feature of the invention, the housing defines a surface in spaced confronting relation to the other damper face and the limit means comprises means interposed between the housing surface and the other diaphragm face. This arrangement provides a simple and effective means of incorporating the limit means into the damper design.

In one embodiment of the invention, the limit means comprises a stop member defined on the housing surface and extending from the housing surface toward the central region of the diaphragm to selectively limit the maximum magnitude of deflection of the central region of the diaphragm.

In another embodiment of the invention, the limit means comprises a spring member positioned between the housing surface and the other diaphragm face to limit the excursions of the central region of the diaphragm in accordance with the parameters of the spring.

In another embodiment of the invention, the limit means comprises a liquid substance positioned between the housing surface and the other diaphragm face so that the excursions of the central region of the diaphragm are limited in accordance with the parameters of the liquid and in accordance with the extent to which the liquid fills the space between the other diaphragm face and the housing surface.

The invention also provides a method of damping vibrations occurring in the hydraulic fluid in the hydraulic actuator system. According to the invention method, a diaphragm is provided having a face forming a boundary wall of the system so that the diaphragm can deflect in response to vibrations transmitted through the hydraulic fluid in the system to effect damping of the vibrations, a stop surface is defined confronting but spaced from the other face of the diaphragm to limit the deflection of the central region of the diaphragm to a predetermined maximum, and the space between the stop surface and the other diaphragm face is selectively varied to selectively accommodate hydraulic control systems of varying characteristics.

In the disclosed embodiment of the invention, the diaphragm is fixed at its periphery to a housing and the housing defines a surface in spaced confronting relation to the other diaphragm face, and the varying step of the invention methodology comprises selectively inserting one or more shim members of various thicknesses in the space between the housing surface and the other diaphragm face. This methodology provides a simple and effective means of altering the response of the damper to suit varying system characteristics.

BRIEF DESCRIPTION OF THE DRAWINGS

FIG. 3 is a cross-sectional view taken on line 3—3 of FIG. 2;

FIG. 4 is a fragmentary perspective view of the damper of FIGS. 1-3;

FIGS. 5, 6, 7 and 8 are, views of modifications of the damper of FIGS. 1-4; and

DETAILED DESCRIPTION OF THE PREFERRED EMBODIMENTS

Figure 1:
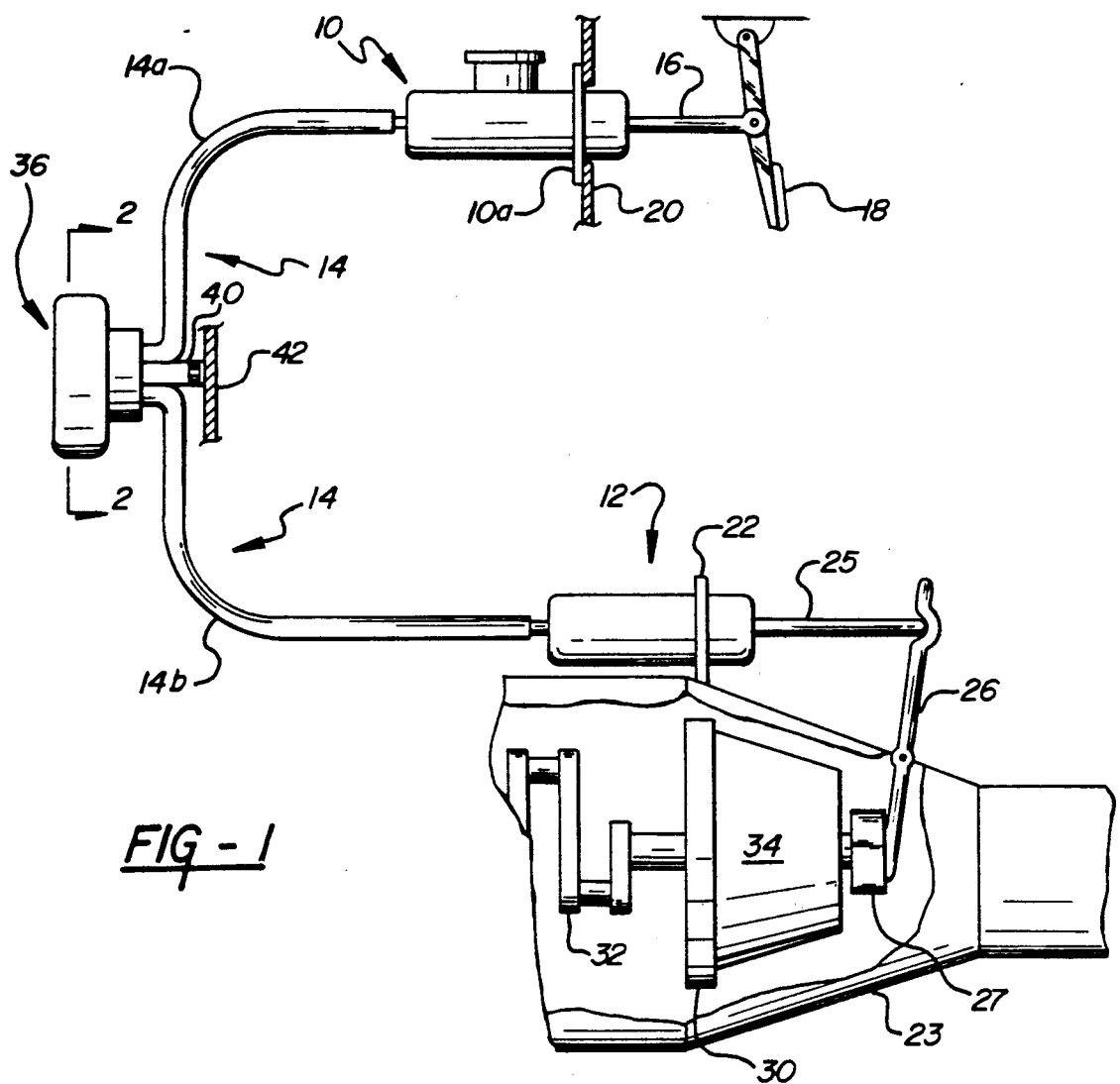
FIG. 1 is a somewhat schematic view of a hydraulic clutch actuator employing the invention damper.
Figure 2:
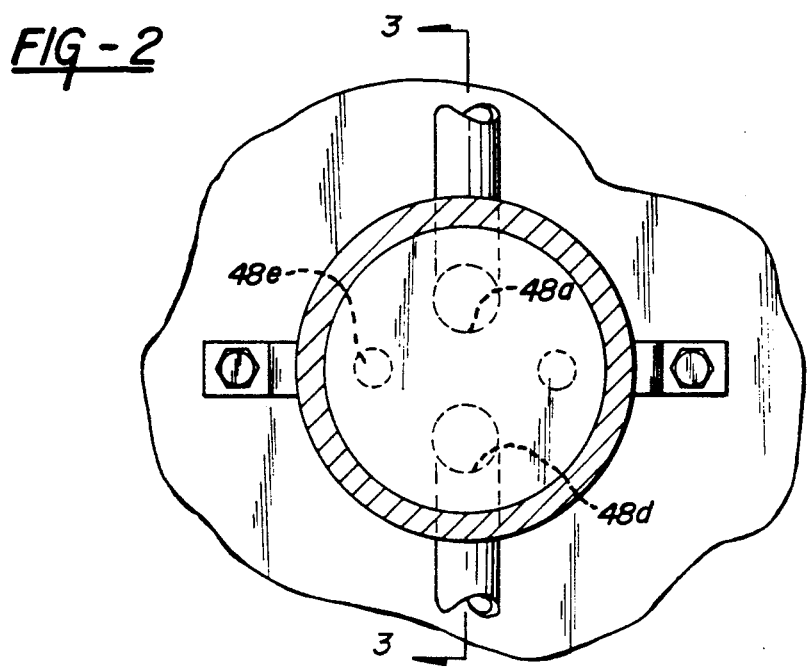
FIG. 2 is a cross-sectional view taken on line 2—2 of FIG. 1.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the firewall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge of pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by a engine crankshaft 32. The invention damper assembly 36 is interposed in conduit 14 and is connected to the outlet of master cylinder 10 by a conduit portion 14a and to the inlet of slave cylinder 12 by a conduit portion 14b.

Damper assembly 36 includes a damper 38 and a bracket 40 to facilitate attachment of damper 38 to a fixed vehicle panel 42.

Damper 38 includes a housing assembly 44 and a diaphragm 46.

Housing assembly 44 has a generally cylindrical configuration and includes a main body housing member 48 and a cover member 50.

Main body housing member 48 is formed of a suitable metallic material and includes an inlet port 48a extending from the front face 48b to the rear face 48c of the housing member; an outlet port 48d extending from the front face 48b to the rear face 48c of the housing member; a pair of threaded bores 48e opening in the front face of the housing member for receipt of bolts 52 passing through the main body portion 40a of bracket 40 and an annular circumferential groove 48f in the rear face of the main body housing member for receipt of an O-ring 53.

Cover 50 is of generally cylindrical configuration, is formed of a metallic material, and includes a lip portion 50a crimped over an enlarged portion 48g of main body member 48; an annular side wall portion 50b circumferentially surrounding the side wall 48h of main body enlarged portion 48g; and a main body cover portion 50c spanning the rear face 48c of the main body member 48 in parallel spaced relation thereto to define a sealed chamber 54 between the main body member rear face 48c and the front face 50d of cover portion 50c.

Diaphragm 46 is formed of a rigid metallic material having a high natural frequency so that it can follow the frequency of the relevant vibration in the actuator system and having preferably a low loss hysteresis. Preferably the diaphragm comprises a sheet steel plate. Diaphragm 46 is clamped around its periphery between cover 50 and main body housing member 48 and, specifically, is clamped between an annular surface 50e proximate the junction between the cover side wall portion 50b and cover portion 50c and a corresponding annular surface 48i defined by the extreme outer periphery of main body member 48 in surrounding relation to groove 48f.

As seen in FIG. 3, the various elements are sized such that, in assembled relation, the O-ring 53 is flattened between disk 46 and the front surface of groove 48f to provide an effective seal as between the housing main body member and the diaphragm.

Diaphragm 46 will be seen to extend across chamber 54 to divide chamber 54 into a front chamber 54a and a rear chamber 54b with rear chamber 54b defined between the rear face 46a of the diaphragm and the front face 50d of cover main body portion 50c and with the front chamber 54a defined between the front face 46b of the diaphragm and the rear face 48c of main body housing member 48.

It will be seen that when the free end of conduit portion 14a is inserted into inlet port 48a and the free end of conduit portion 14b is inserted into discharge 48d, chamber 54a is in communication with the inlet and outlet ports so that the front face 46b of diaphragm 46 constitutes a barrier wall of the hydraulic system so that the diaphragm can deflect in response to vibrations transmitted through hydraulic fluid in the system to effect damping of the vibrations.

As the diaphragm deflects in response to the vibrations transmitted through hydraulic fluid in the system, the center region 46c of the diaphragm inherently undergoes the maximum deflection and thereby experiences the maximum stress so that, if the deflection of the center region of the diaphragm is not controlled, cracking of the center region of the diaphragm becomes a failure mode that may severely limit the fatigue life of a diaphragm.

According to the invention, means are provided to selectively limit the deflection of the center region of the diaphragm whereby to increase the fatigue life of the diaphragm by moving the operating stress on the stress over frequency curve to an acceptable level and shifting the area of stress away from the center of the diaphragm.

This deflection limiting is accomplished in the FIGS. 1-4 embodiment by providing an upset or raised portion 50e at the center of the inner surface 50d of the cover 50 to define a stop surface 50f in spaced confronting relation to the rear face 46a of the central region 46c of the diaphragm so as to selectively limit the maximum extent of deflection or excursion allowed by the central region of the diaphragm during its damping activity. For example, for a diaphragm having a diameter of 1.750 inches, the upset portion 50e of the cover member may be sized and configured to provide a space 60 between the front face 50f of the upset portion and the rear face of the diaphragm of 0.030 inches.

As previously indicated, the provision of a limit stop in spaced confronting relation to the rear face of the center portion of the diaphragm has the effect of limiting the deflection of the center portion of the diaphragm during use and the consequent effect of significantly lengthening the fatigue life of the diaphragm by moving the operating stress on the stress over frequency curve to an acceptable level and shifting the area of stress away from the center of the diaphragm. For example, prior art damper units of the type shown in British patent 1562709, operating under an actuator system pressure of 725 psi, have failed at less than 100,000 cycles whereas the damper of the invention, with the provision of the stop limit means in confronting relation to the rear face of the central region of the diaphragm, has endured over 1,000,000 cycles without failure.

In addition to significantly increasing the fatigue life of the diaphragm, the invention limit stop arrangement provides the further advantage that the distance 60 between the face of the limit stop and the rear face of the central region of the diaphragm may be selectively varied simply by varying the height of the upset portion 50e to thereby allow the invention damper to selectively accommodate hydraulic control systems of varying characteristics.

Figure 9:
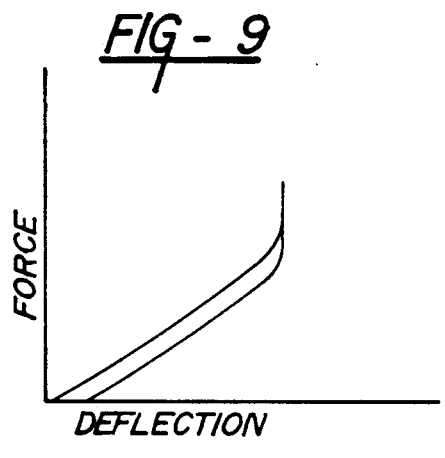
FIGS. 9, 10, 11 and 12 are force versus deflection curves for the FIGS. 1-4 embodiment, the FIG. 5 embodiment, the FIG. 6 embodiment, and the FIG. 7 embodiment, respectively.

The behavior of the diaphragm of the invention damper is seen in the force versus deflection graph of FIG. 9 wherein the hysteresis portion of the curve represents the behavior of the central region of the diaphragm prior to encountering the stop face 50f and the straight line vertical portion of the curve illustrates the fact that the deflection of the central region of the diaphragm does not increase beyond the force required to bottom the diaphragm against the face 50f.

Figure 10:
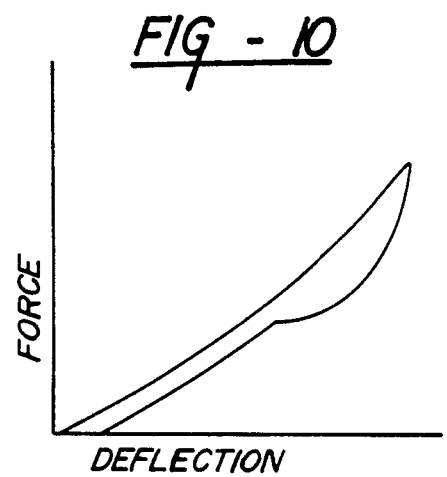

The damper embodiment seen in FIG. 5 is identical to the embodiment of FIGS. 1-4 with the exception that the upset portion 50e of the main body portion of the cover 50 is eliminated and replaced by a separate button member 62 which may be formed of a suitable elastomeric material such, for example, as a polymeric material. The button 62 is suitably secured to the front face 50d of the main body portion of the cover member and, as with the FIGS. 1-4 embodiment, defines a front face 62a in confronting spaced relation to the rear face 46a of the central region of the diaphragm which acts to limit the deflection of the center region of the diaphragm and thereby significantly increases the fatigue life of the diaphragm. As with the upset portion 50e of the FIGS. 1-4 embodiment, the thickness of the button 62 may be selectively varied to vary the size of the space 60 between the front face 62a and the rear face of the diaphragm to accommodate hydraulic control systems of varying hydraulic characteristics. The force versus deflection behavior of the embodiment of FIG. 5 is shown in FIG. 10.

Figure 11:
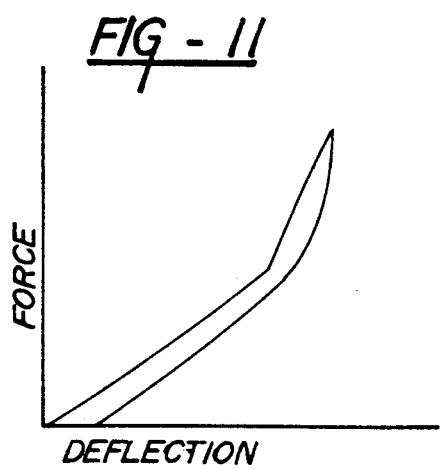

The embodiment of FIG. 6 is generally similar to the embodiment of FIGS. 1-4 with the exception that the upset portion 50e of the main body portion of the cover member is eliminated, a circular recess 50g is provided in the front face of the main body cover portion 50c, and a Belleville spring washer 64 is positioned in the rear chamber 54b between the rear face 46a of the diaphragm and the front face 50d of the cover main body portion with the outer circular edge of the washer positioned in recess 50g so that the Belleville spring washer acts to selectively resist and limit the rearward deflection of the diaphragm in 10 a manner similar to the operation of the upset portion 50e of the FIGS. 1-4 embodiment and the elastomeric button 62 of the FIG. 5 embodiment. The force versus deflection behavior of the embodiment of FIG. 6 is illustrated in the graph of FIG. 11.

Figure 7:
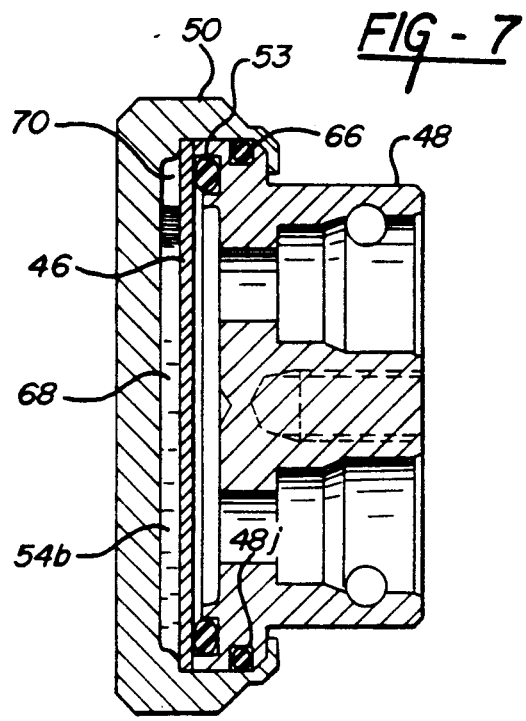
Figure 12:
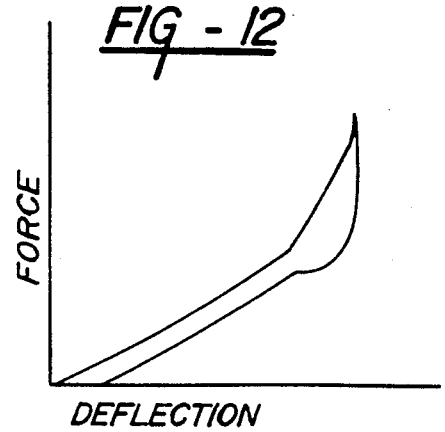

The FIG. 7 embodiment is generally similar to the embodiment of FIGS. 1-4 with the exception that the unit includes an O-ring seal 66 positioned in an annular groove 48j in the main body housing member, the upset portion 50e is eliminated, and a suitable liquid 68 is positioned in the chamber 54b. Liquid 68, which may comprise, for example, silicone oil of various viscosities, preferably partially fills chamber 54 to leave an air gap 70 at the upper end of the chamber, and acts to limit the deflection of the diaphragm 46. The force versus deflection behavior of the embodiment of FIG. 7 is seen graphically in FIG. 12.

Figure 8:
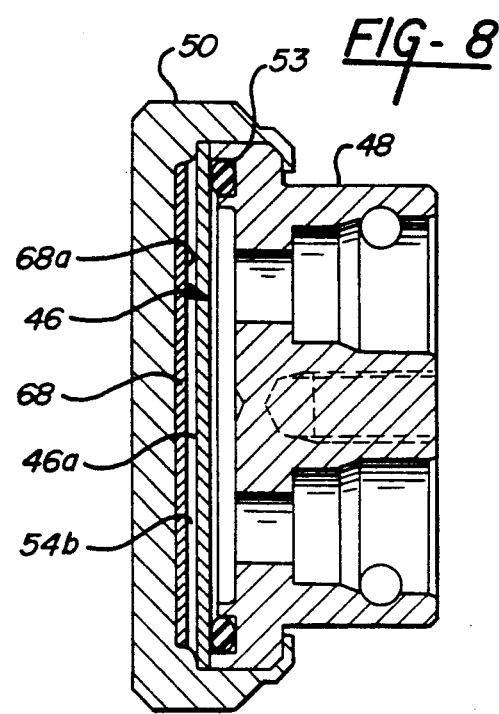

The invention embodiment seen in FIG. 8 is generally similar to the embodiment of FIG. 5 except that the elastomeric button 62 is replaced with a disk-like shim member 68 which has a size corresponding to the size of chamber 54b so that the front face 68a of the shim member provides a limit stop with respect to the entire rear surface area 46a of the diaphragm. As a practical matter, however, due to the fact that the periphery of the diaphragm is fixed to the housing, the shim 68 acts to only limit the rearward deflection of the central region of the diaphragm. The construction of FIG. 8 has the advantage that the shims may be firmly positioned in the pocket or depression defined in the inner face of the main body portion of the cover within surface 48f and has the further advantage that the thickness of the shims may be readily varied to accommodate hydraulic control systems of varying hydraulic characteristics and/or a plurality of relatively thin shims may be utilized to position the front face 68a of the shim or shim stack in desired spaced relation with respect to the rear face of the diaphragm and thereby provide the precise deflection behavior required to accommodate a particular hydraulic control system.

The clutch actuator is preferably provided to the motor vehicle manufacturer in a prefilled form with hydraulic fluid filling the liquid volumes of the master cylinder, slave cylinder, conduit and damper.

The invention damper assemblies will be seen to provide a means of significantly increasing the fatigue life of the damper without decreasing the effectiveness of the damper and will be further seen to provide a convenient means of selectively varying the deflection characteristics of the damper mechanism to accommodate hydraulic control systems of varying hydraulic characteristics.

Whereas preferred embodiments of the invention have been illustrated and described in detail it will be apparent that various changes may be made in the disclosed embodiments without departing from the scope or spirit of the invention.

We claim:

1. A clutch hydraulic actuator system having a vibration damper provided in the system between a master cylinder and a slave cylinder thereof, said damper including a housing, a flat plate diaphragm mounted in said housing with its periphery fixed with respect to the housing and having a first face constituting a boundary wall of the hydraulic system so that the diaphragm can deflect in response to vibrations transmitted through hydraulic fluid in the system to effect damping of the vibrations, and a limiting surface on said housing confronting the other face of said diaphragm and including a raised central portion positioned closer to said other diaphragm face than the remainder of the limiting surface and operative to limit the deflection of the central region of the diaphragm to a predetermined maximum magnitude to limit the stress at the center of the diaphragm to an acceptable level.

2. A clutch actuator according to claim 1 wherein said actuator is provided to the motor vehicle manufacturer in prefilled form with hydraulic fluid filling the liquid volumes in said master cylinder, said slave cylinder, and said damper.

3. A damper for provision in a hydraulic actuator system between a master cylinder and a slave cylinder of the system, said damper including a housing including inlet and outlet ports for connection in the system and defining a chamber in communication with said ports, a flat plate diaphragm fixed at its periphery to said housing and extending across said chamber with one face thereof communicating with said ports so as to form a boundary wall of said system so that said diaphragm can deflect in response to vibrations transmitted through hydraulic fluid in the system to effect damping of the vibrations, and a limiting surface on said housing confronting the other face of said diaphragm and including a raised central portion positioned closer to said other diaphragm face than the remainder of the limiting surface and operative to limit the deflection of the central region of said diaphragm to a predetermined maximum magnitude.

4. A method of damping vibrations occurring in the hydraulic fluid in a hydraulic actuator system, said method comprising:

providing flat plate a diaphragm having a face forming a boundary wall of the system so that the diaphragm can deflect in response to vibrations transmitted through the hydraulic fluid in the system to effect damping of the vibrations;

defining a stop surface confronting but spaced from the other face of the diaphragm to limit the deflection of the central region of the diaphragm to a predetermined maximum magnitude; and selectively varying the space between said stop surface and said other diaphragm face to selectively accommodate hydraulic control systems of varying characteristics.

5. A clutch hydraulic actuator system having a vibration damper provided in the system between a master cylinder and a slave cylinder thereof, the damper including a housing, a diaphragm mounted in the housing with its periphery fixed with respect to the housing and having one face constituting a boundary wall of the hydraulic system so that the diaphragm can deflect in response to vibrations transmitted through hydraulic fluid in the system to effect damping of the vibrations, and limit means confronting the other face of the diaphragm and operative to limit the deflection of the central region of the diaphragm to a predetermined maximum magnitude to limit the stress at the center of the diaphragm to an acceptable level, characterized in that the housing defines a surface in spaced confronting relation to the other diaphragm face and the limit means comprises a stop member defined on the housing surface and extending from the housing surface toward the central region of the diaphragm.

6. A clutch hydraulic actuator system having a vibration damper provided in the system between a master cylinder and a slave cylinder thereof, the damper including a housing, a diaphragm mounted in the housing with its periphery fixed with respect to the housing and having one face constituting a boundary wall of the hydraulic system so that the diaphragm can deflect in response to vibrations transmitted through hydraulic fluid in the system to effect damping of the vibrations, and limit means confronting the other face of the diaphragm and operative to limit the deflection of the central region of the diaphragm to a predetermined maximum magnitude to limit the stress at the center of the diaphragm to an acceptable level, characterized in that the housing defines a surface in spaced confronting relation to the other diaphragm face and the limit means comprises a spring member positioned between the housing surface and the other diaphragm face.

7. A clutch hydraulic actuator system having a vibration damper provided in the system between a master cylinder and a slave cylinder thereof, the damper including a housing a diaphragm mounted in the housing with its periphery fixed with respect to the housing and having one face constituting a boundary wall of the hydraulic system so that the diaphragm can deflect in respect to vibrations transmitted through hydraulic fluid in the system to effect damping of the vibrations, and limit means confronting the other face of said diaphragm and operative to limit the deflection of the central region of the diaphragm to a predetermined maximum magnitude to limit the stress at the center of the diaphragm to an acceptable level, characterized in that the housing defines a surface in spaced confronting relation to the other diaphragm face and the limit means comprises a liquid substance positioned between the housing surface and the other diaphragm face.

8. A damper for provision in a hydraulic actuator system between a master cylinder and a slave cylinder of the system, the damper including a housing including inlet and outlet ports for connection in the system and defining a chamber in communication with the ports, a diaphragm fixed at its periphery to the housing and extending across the chamber with one face thereof communicating with the ports so as to form a boundary wall of the system so that the diaphragm can deflect in response to vibrations transmitted through hydraulic fluid in the system to effect damping of the vibrations, and means carried by the housing and positioned in confronting relation to the other face of said diaphragm and operative to limit the deflection of the central region of the diaphragm to a predetermined maximum magnitude, characterized in that the housing defines a surface in spaced confronting relation to the other diaphragm face and the limit means comprises a stop member defined on the housing surface and extending from the housing surface toward the central region of the diaphragm.

9. A damper for provision in a hydraulic actuator system between a master cylinder and a slave cylinder of the system, the damper including a housing including inlet and outlet ports for connection in the system and defining a chamber in communication with the ports, a diaphragm fixed at its periphery to the housing and extending across the chamber with one face thereof communicating with the ports so as to form a boundary wall of the system so that the diaphragm can deflect in response to vibrations transmitted through hydraulic fluid in the system to effect damping of the vibrations, and means carried by the housing and positioned in confronting relation to the other face of said diaphragm and operative to limit the deflection of the central region of the diaphragm to a predetermined maximum magnitude, characterized in that the housing defines a surface in spaced confronting relation to the other diaphragm face and the limit means comprises a spring member positioned between the housing surface and the other diaphragm face.

10. A damper for provision in a hydraulic actuator system between a master cylinder and a slave cylinder of the system, the damper including a housing including inlet and outlet ports for connection in the system and defining a chamber in communication with the ports, a diaphragm fixed at its periphery to the housing and extending across the chamber with one face thereof communicating with the ports so as to form a boundary wall of the system so that the diaphragm can deflect in response to vibrations transmitted through hydraulic fluid in the system to effect damping of the vibrations, and means carried by the housing and positioned in confronting relation to the other face of said diaphragm and operative to limit the deflection of the central region of the said diaphragm to a predetermined maximum magnitude, characterized in that the housing defines a surface in spaced confronting relation to the other diaphragm face and the limit means comprises a liquid substance positioned between the housing surface and the other diaphragm face.

11. A method of damping vibrations occurring in the hydraulic fluid in a hydraulic actuator system, said method comprising:

providing a diaphragm having a face forming a boundary wall of the system so that the diaphragm can deflect in response to vibrations transmitted through the hydraulic fluid in the system to effect damping of the vibrations;

defining a stop surface confronting but spaced from the other face of the diaphragm to limit the deflection of the central region of the diaphragm to a predetermined maximum magnitude; and selectively varying the space between said stop surface and said other diaphragm face to selectively accommodate hydraulic control systems of varying characteristics;

the diaphragm being fixed at its periphery to a housing and the housing defining a surface in spaced confronting relation to the other diaphragm face;

said varying step comprising selectively inserting one or more shim members of various thicknesses in the space between the housing surface and the other diaphragm face.

* * * * *